United States Patent [19]
Koch et al.

[11] 3,956,761
[45] May 11, 1976

[54] SHUTTER DEVICE FOR A PHOTOGRAPHIC CAMERA

[75] Inventors: Carl Koch, Stetten; Karl Gfeller, Schaffhausen, both of Switzerland

[73] Assignee: Sinar AG Schaffhausen, Feuerthalen, Switzerland

[22] Filed: July 17, 1974

[21] Appl. No.: 489,089

[30] Foreign Application Priority Data
July 19, 1973  Switzerland.................... 10558/73

[52] U.S. Cl................. 354/255; 354/250; 354/252; 354/256; 354/258
[51] Int. Cl.² ............................ G03B 9/10
[58] Field of Search .......... 354/250, 251, 252, 253, 354/254, 255, 256, 257, 258, 268

[56] References Cited
UNITED STATES PATENTS

| | | |
|---|---|---|
| 2,980,004 | 4/1961 | Prentice ............................ 354/255 |
| 3,595,553 | 7/1971 | Vincent ............................ 354/255 |

*Primary Examiner*—L. T. Hix
*Assistant Examiner*—Russell E. Adams, Jr.
*Attorney, Agent, or Firm*—Watson, Cole, Grindle & Watson

[57] ABSTRACT

A shutter device for a photographic camera has a pair of shutter blade members movable between first and second rest positions for opening or closing the camera aperture, including drive devices associated with the blade members for moving them in the same direction during an exposure sequentially and at a time interval, from the first to the second rest position. Additional drive devices associated with the shutter blade members are provided which, for a subsequent exposure, are capable of returning the blade members sequentially and at a time interval, in opposite direction, from the second to the first rest position.

13 Claims, 11 Drawing Figures

SHUTTER DEVICE FOR A PHOTOGRAPHIC CAMERA

This invention relates to a shutter device for a photographic camera, especially for a medium or large format camera equipped for viewing with a focusing screen. The shutter is of the type having two shutter blade members each movable between a first and a second rest position, for opening or closing the aperture, and further having drive devices for the shutter blade members which, for an exposure, are capable of moving the shutter blade members sequentially and with a time interval in the same direction from the first to the second rest position.

For an example of such a shutter device reference is made to the so-called focal plane shutter which has rigid shutter blade members which, for the exposure of photographic materials, are capable of being moved sequentially with an arbitrary difference in time so that the leading shutter blade member opens the aperture for the exposure and the delayed shutter blade member then closes the aperture.

Known designs of such shutter devices require relatively complicated means for controlling the drive devices for the shutter blade members. Since the shutter links must be returned to their initial position in a partially overlapping arrangement, following each shutter activation, so as to prevent an exposure during that process, the shutter blade members also overlap in their initial position prior to the next shutter activation. For that reason the initial positions of the two shutter blade members differ; and the difference in time between the start of the leading shutter blade member and the start of the delayed shutter link must deviate, when the shutter is activated, from the desired exposure time for that certain amount of time which transpires until the shutter blade members' overlap has been overcome. This reason, and others, inhibit the provision of a shutter device with exact, predetermined exposure times, especially when the aperture is relatively large, for example, when its diameter exceeds 50 mm, and when exposure times of 1/100th second or shorter are also required.

Hence, the object of the present invention is to provide a shutter device of the type referred to hereinabove, in which there is no return of the shutter blade members in an overlapping position, and in which the means for driving the shutter blade members are relatively simple and permit a high degree of accuracy with respect to the desired exposure times even with a relatively large aperture and extremely short exposure times.

This objective is satisfied by the provision of drive devices associated with the shutter blade members for the shutter device of the present invention, which drive devices—for a subsequent exposure process—are capable of returning the shutter blade members in sequence and with a time interval, in the opposite direction, in like manner, from the second rest position to the first one.

This shutter device design does not require the shutter blade members to be returned to their initial position, following an exposure, so that there is no need for an overlapping arrangement of the shutter blade members. It follows that, for the shutter blade members' drive device, an additional period of time over and above the desired exposure time need not be considered which would result from a partial overlap of the shutter blade members in their initial position whenever the shutter is activated. Thus, a source of possible inaccuracies in exposure time has been eliminated. The return of the shutter blade members to their initial position, referred to above, is no longer necessary because the shutter blade members may accomplish the desired process of exposure when moving in one direction as well as when moving in the opposite direction, in like manner.

In an appropriate further development of the shutter device provided according to this invention, the drive device for the shutter blade members may be simplified substantially in comparison with known designs, by mounting each of the shutter blade members so that they are freely movable, and by equipping the drive devices with one striker each which actuates the associated shutter blade member merely via a cam in such manner that the shutter blade member is moved by a sudden stroke of the striker of the one or the other associated drive device and, thereafter, by free travel from the first to the second rest position, and vice versa.

Thus, the drive device does not affect the associated shutter blade member during that phase which is critical for short time exposures; and another source of possible inaccuracies of exposure time is eliminated.

In a particularly appropriate embodiment of the shutter device provided by this invention, the operating path distances of the drive devices' strikers and the distances between the aperture and the adjacent edges of the shutter blade members in their rest positions are adjusted to one another in such manner that in each instance in which a drive device is activated its striker accelerates the shutter blade member to a constant speed before the named shutter blade member edge starts to sweep across the aperture. Further, for a bounceless stopping of the shutter blade members when reaching their rest positions, braking devices may be designed and affixed advantageously in such manner that they prompt a deceleration of the shutter blade members' movements only after that edge of the appropriate shutter blade member which sweeps across the aperture has left the aperture's field.

In a particularly advantageous embodiment, the shutter blade members may be swivel-mounted upon an axis with no less than one roller bearing, in which design the roller bearings are mounted at least close to the center of gravity of the shutter blade member in question. In this manner, effects of friction and gravity upon the free travel of the shutter blade members, resulting from dynamic inertia, may be held to a negligible minimum.

Preferably, the shutter blade members' drive devices are each equipped with a solenoid with a percussion armature which, whenever the solenoid is first energized, cooperates with the associated shutter blade member by means of the cam and which, together with this shutter blade member may be accelerated from a rest position to a maximum speed. This permits an especially simple mechanical construction of the shutter device; moreover, the drive force acting upon the shutter blade members always is low at the outset and increases thereafter until the affected shutter blade member separates from the percussion armature for free onward travel, whereas the opposite would be true in the case of a spring-activated drive. The brake devices noted above also may each be equipped with a solenoid whose armature is capable of activating a spring-controlled brake arm. In this case the design preferably causes the brake arm to be spring held, against the shutter blade member to be stopped, while the magnet is de-energized; but causes the brake arm to be removed from the shutter blade member while the magnet is energized.

Further details and characteristics of preferred embodiments of the shutter device provided by this invention can be gathered from the following detailed description of the invention when taken in conjunction with the accompanying drawings in which a preferred emample of execution of the invention and a partial variation thereof are depicted.

Figure 1:
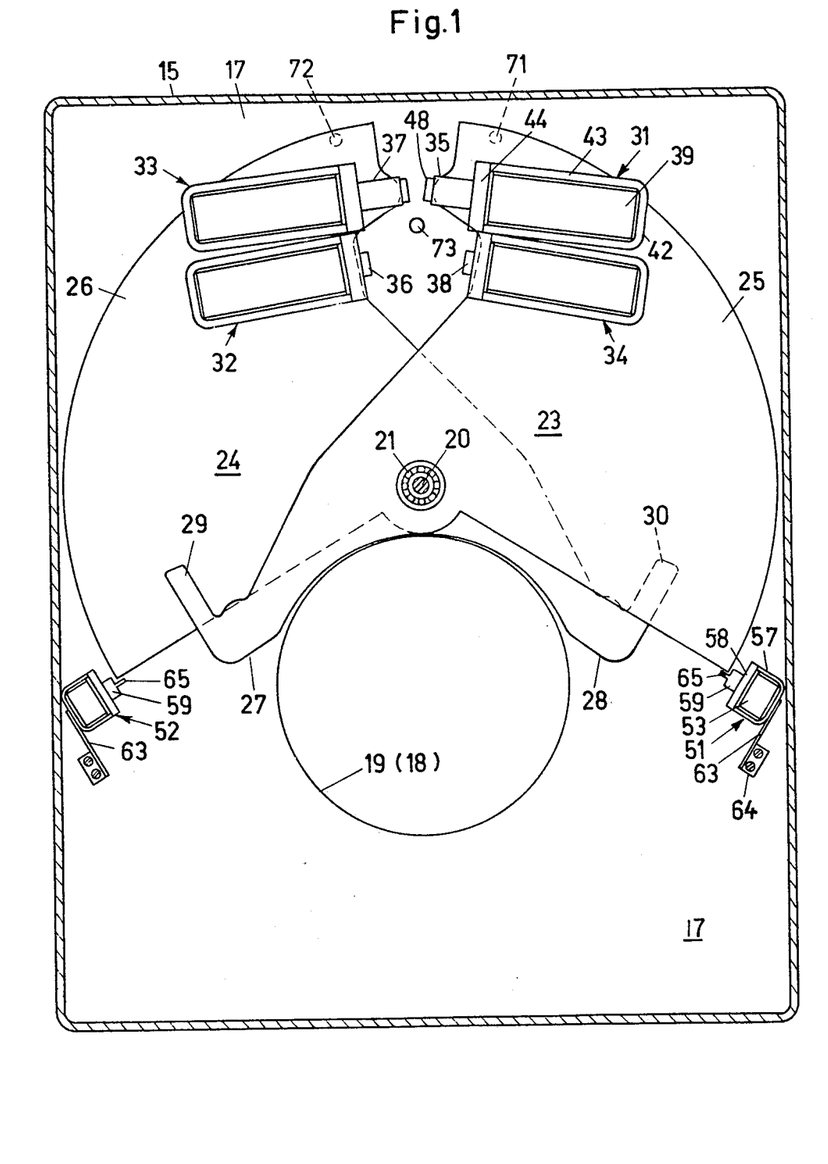
FIG. 1 shows a shutter device according to the invention with the front wall of the shutter housing removed and the aperture fully opened.

The shutter device shown in FIG. 1 for a large-format focusing screen camera includes a shallow housing 15 having a front wall and a rear wall 17, each of which having an opening 18 and 19, respectively, for the aperture. The diameter of openings 18 and 19 may, for example, be in the order of magnitude of 75 mm, although the shutter device is also suitable for apertures with lesser or greater diameters. An axle 20 is secured with its ends in front wall and rear wall 17 and supports two ball bearings 21 having outer rings rotatable independently of one another. Shutter blade members 23 and 24, comprising flat discs, are attached to the outer ring of ball bearings 21. The common rotational axis of ball bearings 21 and 22 is perpendicular to the plane of each shutter blade member 23 and 24, and the two shutter blade members are arranged close to one another with a relatively small distance in the direction of the rotational axis of the ball bearings.

Figure 2:
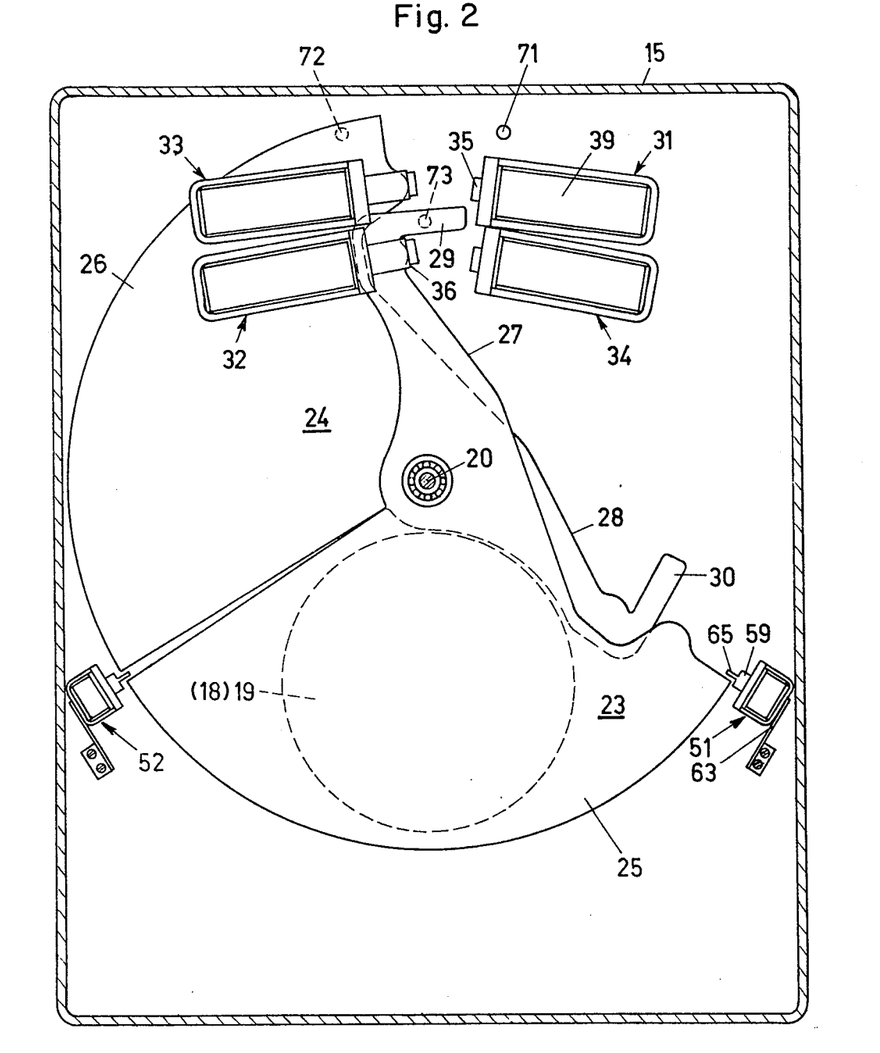
FIG. 2 is a view, similar to FIG. 1, of the shutter device with a closed aperture.

Each of the shutter blade members 23 and 24 comprises a circular sector-shaped shutter blade 25 and 26 and an arm 27 and 28 extending outwardly of the vertex of its shutter blade away from axle 20, both arms having an angled leg 29 and 30, as is clearly shown in FIG. 1. The shape and size of each shutter blade 25 and 26 are such that the shutter leaf is capable of totally covering aperture 18, 19 and thus closing the aperture if shutter blade member 23 or 24 is swivelled into one of its rest positions as shown in FIG. 2 or in FIG. 3. However, both shutter blade members 23 and 24 may also be swivelled into another rest position in which they totally expose aperture 18, 19, as is seen in FIG. 1. It may be advantageous to attach, to arms 27 and 28, weight-balancing pieces of material (not shown) which will cause the center of gravity of each shutter blade member to nearly coincide with the rotational axis of the appropriate ball bearing 21.

In order to permit movement of shutter blade members 23 and 24 from one into the other of the noted rest positions, each shutter blade member has a pair of drive devices 31, 32 and 33, 34 associated respectively thereto. These drive devices comprise solenoids, respectively provided with percussion armatures 35, 36, 37, 39. All solenoid drive devices are identical, with the details of a typical drive device 31 shown in FIG. 1. An electrical winding 39 is affixed to a U-shaped yoke 42, 43 of ferromagnetic material. Legs 43 of this yoke extend along opposite outer edges of winding 39 to the opposite end of winding 39 where they are connected to each other by a ferromagnetic end plate 44. End plate 44 has an opening through which the movable armature extends. Stationary parts 39, 42, 43 and 44 of the solenoid are affixed to front wall of shutter housing 15 in some suitable manner. That end of ferromagnetic armature which is outwardly of winding 39, is linked with a striker plate 48 which, in turn, is intended to work with a portion of the edge of one shutter blade 25 in order to give the latter a sudden drive impulse. As noted earlier, the remaining drive devices 32, 33, and 34 are fully identical with drive device 31 described with reference to FIG. 1.

Figure 3:
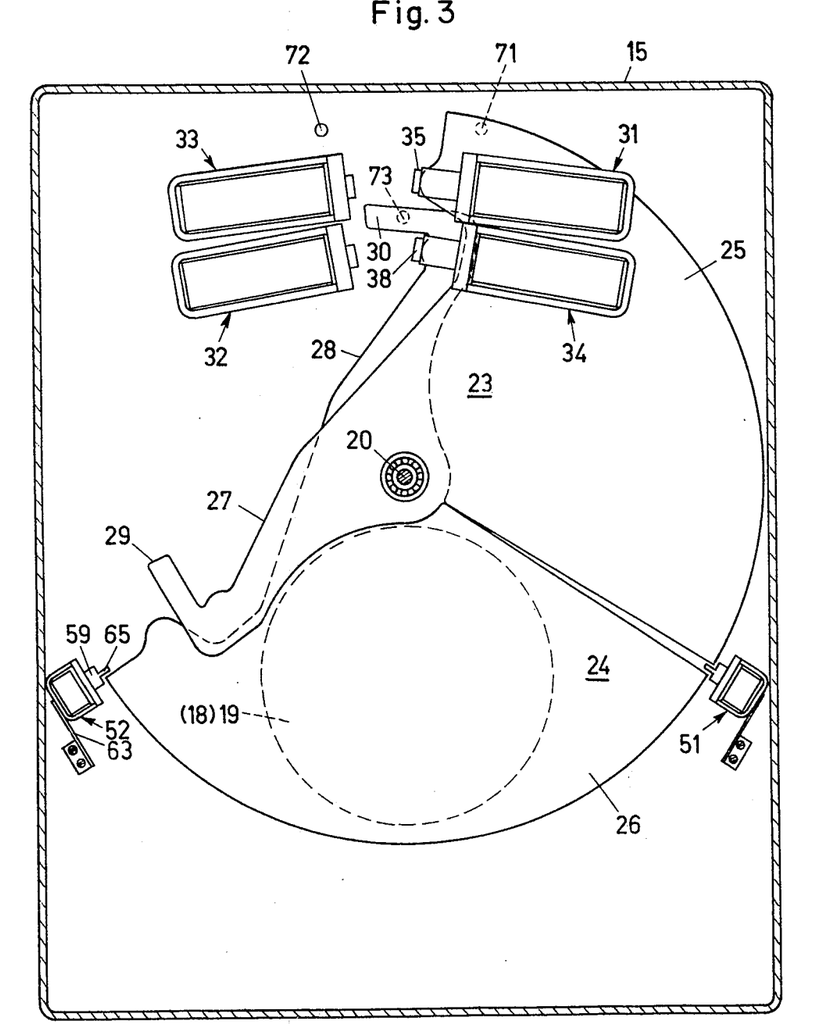
FIG. 3 is a view similar to FIG. 2, with the shutter blade members shown in the opposite position.

The arrangement of the described electromagnetic drive devices 31 to 34 and the shape of shutter blade members 23 and 24 are related to one another in a manner, as follows: armature 35 of drive device 31 can function only with an edge portion of shutter blade 25 in order to effect a clockwise movement of shutter blade member 23, if this shutter blade member is in an open position (FIG. 1). Armature 36 of drive device 32 can function only with an edge portion of arm 27 in order to effect a counterclockwise movement of the same shutter blade member if this shutter blade member is in a closed position (FIG. 2). Armature 37 of drive device 33 can function only with an edge portion of shutter blade 26 in order to effect a counterclockwise movement of the second shutter blade member 24 if this shutter blade member is in an open position (FIG. 1). Armature 38 of drive device 34 can function only with an edge portion of arm 28 in order to effect a clockwise movement of the same shutter blade member 24 if this shutter blade member is in a closed position (FIG. 3). A detailed explanation of the shutter device's mode of operation is given later.

Two electromagnetic brake devices 51 and 52 (FIGS. 1, 2 and 3) are provided for the purpose of locking shutter blade members 23 and 24 in their open position or in their closed position, as well as for effecting a bounceless stopping of shutter blade members 23 and 24 when entering the open or closed positions. Both are of identical design. Brake device 51 is explained, in detail, as follows, with reference to FIG. 1.

There is an electrical winding 53 provided associated to a U-shaped yoke made of a ferromagnetic material, the legs 57 (FIG. 1) of which extend on opposite sides outwardly of winding 53 up to the opposite end thereof, and are connected there by an end plate 58 consisting of ferromagnetic material. End plate 58 has an opening through which extends a rod-like, movable armature 59 made of ferromagnetic material. A non-magnetic rod 62 (FIG. 8), e.g., of a plastic material, is inserted coaxially in armature 59; and it penetrates a bore-hole of yoke 57 and may be moved axially together with armature 59. The free end of rod 62 rests against leaf spring 63 which is fastened to wall 17 of shutter housing 15 by means of a carrier 64 (FIG. 1). Stationary parts 53, 57 and 58 of the brake device are attached to the same wall in some suitable manner. The end portion of armature 59 located outwardly of winding 53 is designed as a brake and locking part 65. Part 65 is in the shape of a plate disposed at right angles to the planes of shutter blade members 23 and 24 as can be seen in FIG. 1. As noted earlier, the other brake device 52 is completely identical is design to brake device 51 described above.

In order to control the operations of the described brake devices in the manner desired, there are several position monitors 71, 72, 73 (FIGS. 1, 2, 3, 4), shown only schematically, which monitor a given position of shutter blade members 23 and 24. Position monitors 71 and 72 may, for example, be photoelectrical and they are arranged in such manner that they are covered by shutter blade 25 or shutter blade 26 when it enters its open position (FIG. 1). Position monitor 73 is in such a location that it is covered by the leg or continuation piece 29 of the one shutter blade member 23 when shutter blade 25 moves into its closed position (FIG. 2); and that it is covered by the leg or continuation piece 30 of the other shutter link 24 when shutter blade 26 moves into its closed position (FIG. 3).

Electrical circuitry for controlling the electromagnetic drive devices 31 to 34 and the brake devices 51 and 52, also functioning electromagnetically together with position monitors 71, 72 and 73, is not an object of this invention; hence, it is not described in detail herein. For an understanding of the functioning of the described shutter device it suffices to describe the sequentially occurring functions.

The described shutter devices operate as follows:

In FIG. 1, both shutter leaves 25 and 26 are in open positions so that aperture 18, 19 is open. This position of the shutter device permits the viewing of the focusing screen in the camera for focusing the image to be photographed. Also, time delay exposures may be made with the shutter device in this position. All electromagnetic windings of drive devices 31 to 34 and of brake devices 51 and 52 are de-energized. Armatures 36 and 38 of drive devices 32 and 34 are in a withdrawn position, whereas armatures 35 and 37 of drive devices 31 and 33 are in an extended position since they have been pushed into that position by shutter blades 25 and 26. Armatures 59 of brake devices 51 and 52 have been pushed into the extended position by leaf springs 63, in which position the brake and locking part 65 of the one brake device 51 locks shutter blade member 23 in its position and in which part 65 of the other brake device 52 locks shutter blade member 24 in its position, as is shown in FIG. 1.

Figure 5:
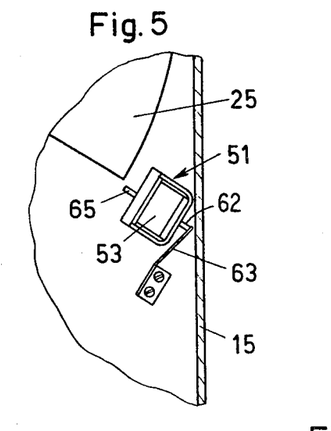
FIGS. 5 to 9 show various phases of movement of the brake devices and the shutter blade members according to the invention.

When aperture 18, 19 is to be closed by means of shutter blade 25, winding 53 of brake device 51 is energized, which causes armature 59 to be pulled into winding 53, overcoming the action of leaf spring 63, and which further causes brake and locking part 65 to completely lift off shutter blade 25, as shown in FIG. 5. Winding 39 of drive device 31 is energized consecutively or simultaneously. This causes armature 35 to be attracted and striker plate 48 of the armature imparts a sudden drive impulse upon shutter blade 25. Shutter blade member 23 is accelerated progressively until armature 35 has been pulled in completely whereupon shutter blade member 23 continues to turn clockwise at constant speed solely because of its mass inertia until aperture 18, 19 is covered completely by shutter blade 25. Position monitor 71 interrupts the flow of current through winding 39 of drive device 31 at that instant when shutter blade 25 uncovers it.

Figure 6:
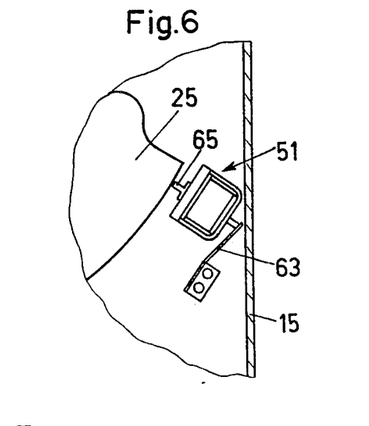

Immediately prior to shutter blade member 23 reaching its closed position shown in FIG. 2, continuation piece 29 of arm 27 covers position monitor 73 which immediately interrupts the flow of current through winding 53 of brake device 51. When armature 59 is expelled by leaf spring 63, the brake and locking part 65 is pressed against the circumferential edge of shutter blade 25, as shown in FIG. 6. This results in a braking action upon shutter blade member 23. At approximately the same time as continuation piece or leg 29 commences to cover position monitor 73, arm 27 moves against armature 36 of drive device 32. Hence, armature 36 is expelled by arm 27 during which process the energy required for accelerating armature 36 is withdrawn from shutter blade member 23. The latter experiences a deceleration resulting from that withdrawal which, in addition to the effect of brake device 51, occasions a bounceless and concussionless stopping of shutter blade member 23 as it enters its closed position as shown in FIG. 2. As soon as the closed position has been attained fully by shutter blade member 23, brake and locking part 65 of brake device 51 snaps into place behind the trailing edge of shutter blade 25, prompted by leaf spring 63. Consequently, shutter blade member 23 is form-fittingly locked in its closed position.

If aperture 18, 19 is to be re-opened, either for a delayed time exposure or for focusing through the focusing screen, winding 53 of brake device 51 is energized in order to attract armature 59, whereby the action of leaf spring 63 is overcome, and brake and locking part 65 is lifted off shutter blade 25. The winding of drive device 32 is energized consecutively or simultaneously. This prompts armature 36 to be attracted during which process the latter imparts a sudden drive impulse upon arm 27, thus progressively accelerating shutter blade member 23 until armature 36 is fully pulled up. Thereafter, shutter blade member 23 moves onward at constant speed and in a counterclockwise direction solely because of its mass inertia, until aperture 18, 19 is fully uncovered by shutter blade 25. Position monitor 73 stops the flow of current through the winding of drive device 32 at that instant at which continuation piece 29 has exposed it.

Figure 7:
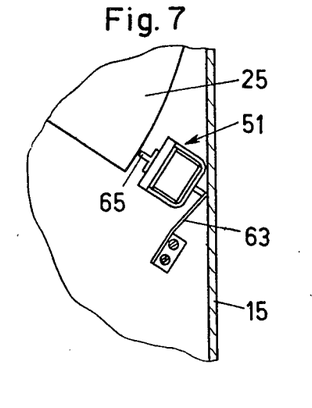

Immediately prior to shutter blade member 23 reaching an open position as shown in FIG. 1, shutter blade 25 covers the photoelectric position monitor 71, which instantly interrupts the flow of current through the winding of brake device 51. Leaf spring 63 now expels armature 59 and pushes brake and locking part 65 against the circumferential edge of shutter blade 25 as shown in FIG. 7. Thus, the movement of shutter blade member 23 is braked. At approximately the same time that shutter blade 25 starts to cover position monitor 71, the leading edge of shutter blade 25 touches armature 35 of drive device 31. This causes armature 35 to be expelled; the energy needed for accelerating armature 35 being withdrawn from shutter blade member 23. Accordingly, the latter experiences a deceleration which, in addition to the effect of brake device 51, occasions a bounceless and concussionless stopping of shutter blade member 23 as it enters its open position shown in FIG. 1. As soon as the open position of shutter blade member 23 is fully reached, brake and locking part 65 of brake device 51 snaps into place behind the trailing edge of shutter edge 24, prompted by the blade spring. Consequently, shutter blade member 23 is form-fittingly locked in its open position.

Figure 8:
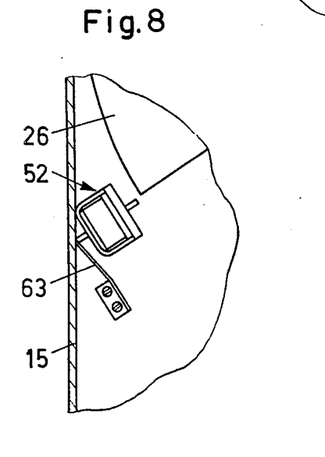

The subsequent closing of aperture 18, 19, for example, following a delayed time exposure, is accomplished with the other shutter blade 26. Initially, the winding of brake device 52 is energized which causes the brake and locking part 65 of this brake device to be completely lifted off shutter blade 26, overcoming the effect of leaf spring 63, as seen in FIG. 8. The winding of drive device 33 is energized subsequently or simultaneously which causes armature 37 to be attracted and a sudden drive impulse to be imparted upon shutter blade 26. The latter is accelerated progressively during this process, until armature 37 has been fully pulled up whereupon shutter blade member 24 continues to move at constant speed counterclockwise owing to the effect of its mass inertia, until aperture 18, 19 is covered, as shown in FIG. 3. As soon as shutter blade 26 has exposed position monitor 72, this position monitor disconnects the flow of current through the winding of drive device 33.

Figure 9:
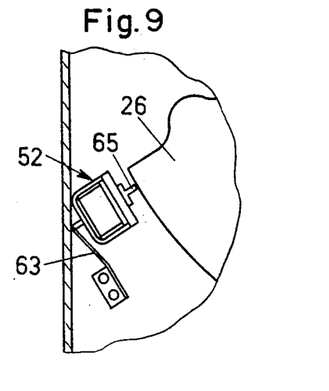

Just prior to the shutter blade member reaching its closed position shown in FIG. 3, continuation piece 30 of arm 28 covers position monitor 73 which promptly interrupts the flow of current through the winding of brake device 52. The action of leaf spring 63 causes brake and locking part 65 of brake device 52 to be pressed against the circumferential edge of shutter blade 26, as shown in FIG. 9. This prompts the movement of shutter blade member 24 to be braked. Almost simultaneously, as continuation piece 30 starts to cover position monitor 73, arm 28 touches armature 38 of drive device 34. This causes armature 38 to be expelled during which process the energy needed to accelerate armature 38 is withdrawn from shutter blade member 24. Consequently, the latter experiences a deceleration which, in addition to the effect of brake device 52, occasions a bounceless and concussionless stopping of shutter blade member 24 as it enters its closed position per FIG. 3. As soon as shutter blade member 24 has fully reached its closed position, brake and locking part 65 of brake device 52 snaps into place behind the trailing edges of shutter lead 26, prompted by leaf spring 63. Consequently, the shutter blade member is form-fittingly locked in its closed position.

If aperture 18, 19 is to opened again, shutter blade member 24 is returned from its closed position as shown in FIG. 3 to its open position as shown in FIG. 1. For this purpose, initially, the winding of brake device 52 is energized and thus brake and locking part 65 is completely lifted off shutter blade 26, overcoming the action of leaf spring 63. The winding of drive device 34 is energized, subsequently or simultaneously, which causes armature 38 to be attracted. The latter imparts a sudden drive impulse upon arm 28 of shutter blade member 24 so that the latter is accelerated progressively until armature 38 is fully pulled. Thereafter, shutter blade member 24 continues to move at constant speed in a clockwise direction solely because of the effect of its mass inertia, until aperture 18, 19 is fully exposed. Position monitor 73 stops the flow of current through the winding of drive device 34 as soon as it is exposed by the continuation piece 30.

Immediately prior to shutter blade member reaching its open position shown in FIG. 1, shutter blade 26 covers position monitor 72; the latter immediately interrupts the flow of current through the winding of brake device 52. Brake and locking part 65 of brake device 52 is pushed against the circumferential edge of shutter blade 26 by the action of leaf spring 63; this causes the movement of shutter blade member 24 to be braked. At about the same time, the leading edge of shutter blade 26 touches armature 37 of drive device 33. This causes armature 37 to be expelled; during this process the energy required for accelerating armature 37 is withdrawn from shutter blade member 24. Thus, the latter experiences a deceleration which, in addition to the effect of brake device 52, occasions a bounceless and percussionless stopping of shutter blade member 24 as it enters its open position shown in FIG. 1. As soon as the open position is reached, brake and locking part 65 of brake device 52 snaps into place behind the trailing edge of shutter blade 26. Consequently, shutter blade member 24 is form-fittingly locked in its open position. It is apparent that, for each opening and closing process, shutter blade members 23 and 24 are moved in the same direction; and that for sequential opening and closing processes, the movements of the shutter blade members alternate in one direction and the opposite direction.

Figure 4:
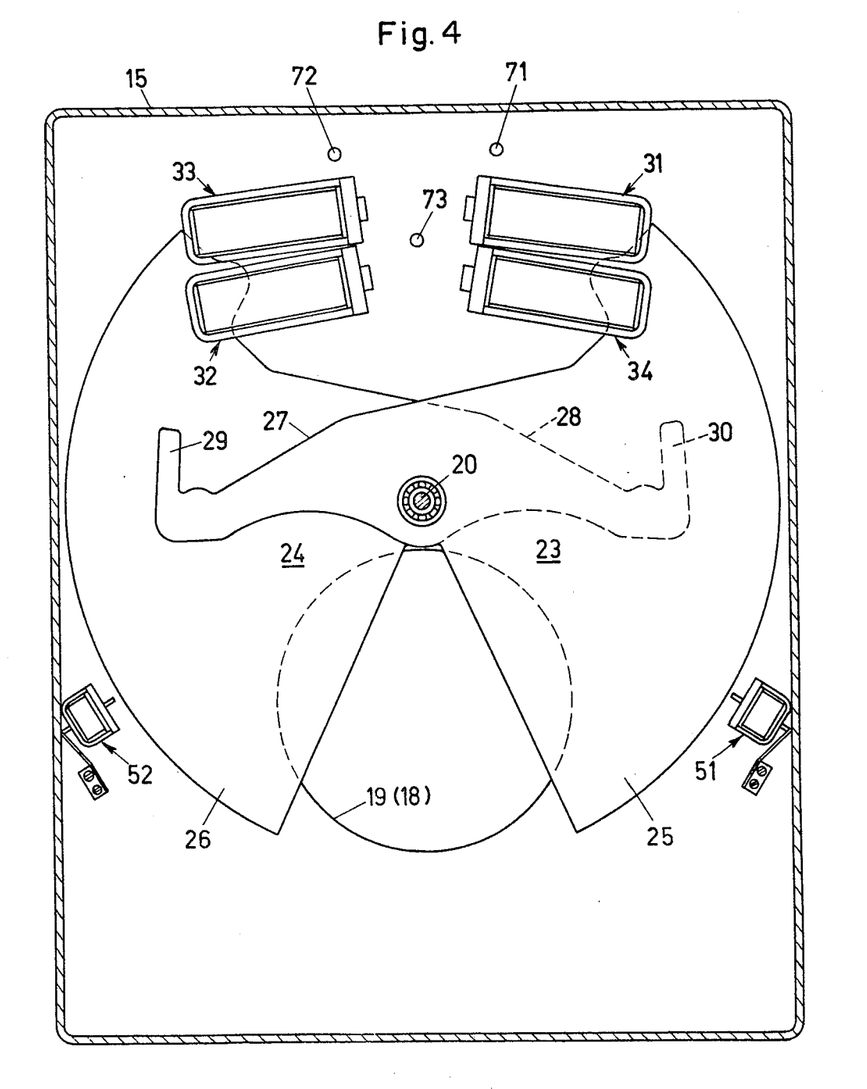
FIG. 4 shows the FIG. 2 shutter device during a short time exposure.

In the case of a short exposure, the described aperture 18, 19 opening and closing processes are exactly alike, but the movement of the shutter blade member which opens the aperture is not yet completed when the movement of the shutter blade member closing the aperture commences. The two shutter blade members follow one another in the same direction of turn, with an interval in time which corresponds to the desired exposure time. Shutter blades 25 and 26 retain an open sector between themselves, the width of which progressively decreases with shorter exposure times (FIG. 4).

In order to assure that, even during extremely short exposures, the acceleration phase of shutter blade members 23 and 24 exerts no interference upon the accuracy of exposure, the functional path distances of armatures 35 to 38 of drive devices 31 to 34 on the one hand, and the distance between aperture 18, 19 and the adjacent edges of shutter blades 25 and 26 in their final positions, on the other, are attuned to one another in such manner that in each case in which winding 39 of one of the drive devices 31 to 34 is energized, its armature is capable of accelerating the appropriate shutter blade member 23 or 24 to a constant speed before the named edge of the shutter blade commences its sweep across the aperture. In order to also prevent an undesirable effect of the braking phase of shutter blade members 23 and 24 upon the accuracy of the exposure, brake devices 51 and 52 are arranged in such manner that they cause a delay in the movement of the shutter blade members, in each case, only after the edge of the appropriate shutter blade member which sweeps across the aperture has left the area of the aperture. In this manner it is possible to attain even such short exposures as 1/1,000 second with an unusually high degree of accuracy and with an even exposure of the entire area of aperture 18, 19.

The advantage of the described shutter device is that the shutter blade members, following an exposure or prior to the next exposure, need not be returned to a given initial position, since both shutter blade members 23 and 24, in each case, move in the same direction, i.e., alternating in a clockwise or a counterclockwise direction whenever aperture 18, 19 is opened and closed again. Since a return of the shutter blade members to a given initial position is no longer necessary, shutter blades 25 and 26 need not overlap in each case prior to exposure. This gives the advantage that the start of the two shutter blade members 23 and 24 may occur in sequence, with an interval of time which accurately corresponds to the desired exposure time.

The fact that both shutter blade members 23 and 24 always move in the same direction during an exposure, has the advantage that effects of gravitation, even if these are indeed minor, are equal with respect to the movement process of both shutter blade members and thus compensate for one another in their effect upon the exposure time. Further, effects upon the travel speed of shutter blade members 23 and 24, prompted by other causes such as changes in temperature, fluctuations in electrical voltage, etc. have practically no effect upon exposure times since the named effects in each case operate in like manner upon both shutter blade members so that travel speeds of both shutter blade members change in corresponding fashion which, in turn, leaves the resulting exposure time unchanged. Accordingly, no correction devices are necessary in order to compensate for interfering effects resulting from gravitation, temperature changes, voltage fluctuations, etc.

Since shutter blade members 23 and 24 are mounted in place by means of ball bearings 21 and 22, the frictional resistance of the shutter blade members is so low that it has practically no effect upon the travel speed of the shutter blade members. Hence, the speed of shutter blade members 23 and 24 is practically constant during their free travel. During this phase of movement there is no influence of drive devices upon the shutter blade members as has been the case so far with known devices. Thus, the drive devices have no influence upon the shutter blade members during the actual exposure process, which negates the possibility of interference from this aspect, too. Shutter blade members 23 and 24 are arranged and movable in complete independence from one another so that mutual effects are impossible. Likewise, collisions between the two shutter blade members 23 and 24 are avoided.

As noted above, acceleration and slowing-down of the shutter blade members occurs, in each case, outside the area of aperture 18, 19 which prevents inaccuracies in exposures resulting from varying initial and final travel characteristics. Exposure is even for all area elements of aperture 18, 19. Thus, the described shutter device may be used without disadvantage as a behind-the-lens shutter without fear of an uneven exposure of various area zones of the photographic material.

Finally, it should be noted that shutter blade members 23 and 24 are stopped, whenever entering their rest positions, by brake devices 51 and 52 and by returning the striker armature of one of the drive devices 31 to 34, in such manner that neither bouncing nor concussion occurs. Even when imparting the drive impulses by means of drive devices 31 to 34, no interfering concussions occur that might have a detrimental effect upon the photographic image. It has been demonstrated that, at the beginning as well as at the end of an exposure, the vibrations of the described shutter device are less pronounced than in known devices with spring-loaded drives.

Figure 10:
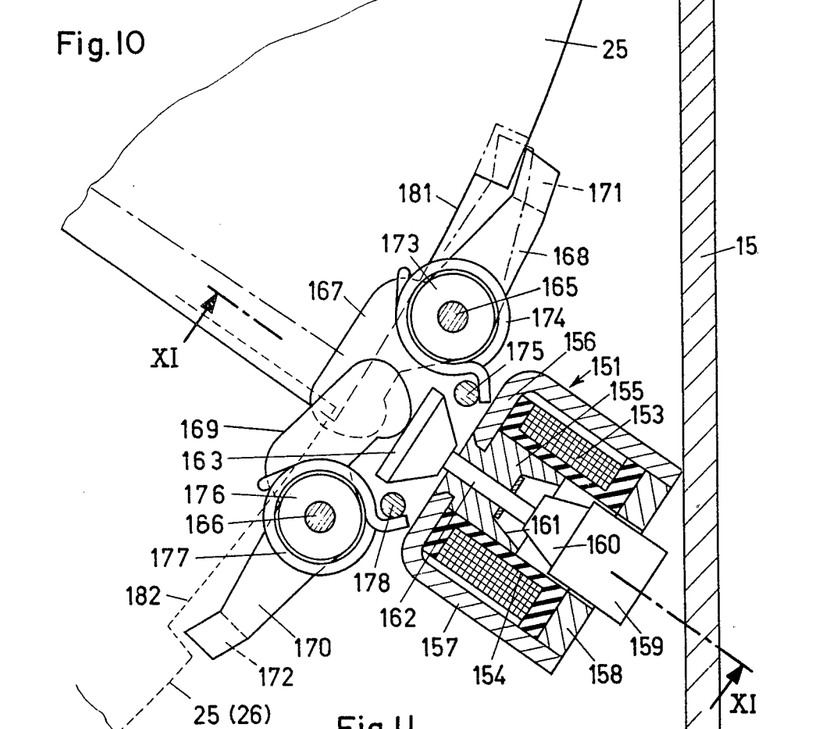
FIG. 10 shows, on a larger scale, a preferred design variation of a brake device, partly in section and taken at line X—X of FIG. 11.
Figure 11:
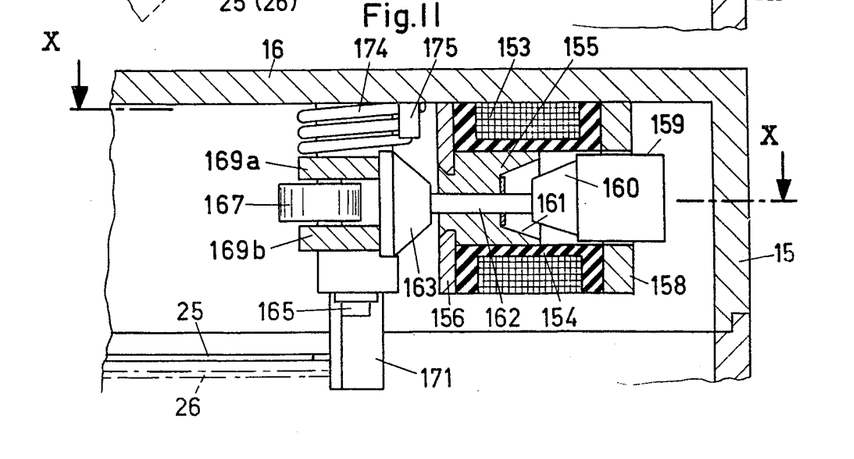
FIG. 11 shows the same brake device in section taken at line II—II of FIG. 10.

FIGS. 10 and 11 illustrate a partial variation of the shutter device described above. In this variation, brake device 51 (FIG. 1) has been replaced by a brake device 151 of different design which functions in connection with one of the shutter blades 25. The other brake device 52, which functions together with the other shutter blade 26, is also replaced with a like variation.

An electrical winding 153 is mounted on a hollow spool body 154 into which a ferromagnetic core 155 projects. The outer end of core 155 is connected with the center stem 156 of a U-shaped yoke of ferromagnetic material, its legs 157 extending along opposite sides outwardly of winding 153 up to the opposite end of spool body 154 and being connected there by a ferromagnetic end plate 158. End plate 158 has an opening through which a rod-like movable armature 159 of ferromagnetic material projects. End portion 160 of armature 159, within the hollow space of spool body 154, is in the shape of a truncated cone and is capable of entering a depression 161, with like geometric shape, of core 155 when winding 153 is energized. Inserted coaxially within the truncated cone-like end portion 160 of armature 159 is a rod 162 of non-magnetic material, such as a plastic material or brass. Rod 162 penetrates a bore hole in core 155 and is coaxially movable with armature 159. The free end of rod 162 has a tappet head 163. Stationary parts 153 to 158 of the brake device are mounted in some suitable manner to a wall such as 16 of housing 15 of the shutter device.

On the same wall are mounted two stationary axle bolts 165 and 166 on each of which two-armed rockers 167, 168 and 169, 170 are rotatably mounted. One arm 167 of the first rocker and one arm 169 of the second rocker are arranged in such manner that they face one another and are capable of functioning together with tappet head 163. For reasons of symmetry, arm 169 of the second rocker is forked into two parts 169a and 169b in between which arm 167 of the first rocker engages, as can be seen in FIG. 11. The other arm 168 of the first rocker has at its end a brake and locking piece 171 projecting outward at a right angle (FIGS. 10 and 11) which is intended to function together with the circumferential edge of shutter blade 25 when it enters its open position. Likewise, the other arm 170 of the second rocker has a right-angled brake and locking piece 172 (FIG. 10) which is intended to function together with the circumferential edge of the same shutter leaf 25 when it enters its closed position. A spring 174 is wound about a cylindrical hub 173 of the first rocker 167, 168 whose end portion engages this rocker while the other end of spring 174 is anchored to a retaining bolt 175 which is permanently mounted upon wall 16. Spring 174 tends to swivel rocker 167, 168 in such manner that arm 167 moves toward tappet head 163. Analogously, a spring 177 is wound about a cylindrical hub of the second rocker 169, 170 whose end portion engages this rocker while the other end of spring 177 engages a retaining bolt 178 securely mounted on wall 16. Spring 177 tends to swivel rocker 169, 170 in such manner that arm 169 moves toward tappet head 163.

Contrary to the embodiment shown in FIGS. 1, 2, 3 and 4, each of the shutter blades 25 and 26 in the FIGS. 10 and 11 embodiment has, as its circumferential edge, two cut-outs 181 and 182 which border on the radial edges of the corresponding shutter blade.

The mode of operation of brake device 151 shown in FIGS. 10 and 11 is as follows:

Winding 153 is de-energized while the shutter device is in its rest position. Springs 174 and 177 swivel the two rockers 167, 168 and 169, 170 in such manner that their arms 167 and 169, facing each other, and using tappet head 163 and rod 162, move armature 159 toward the outside, i.e., away from core 155. If one of the shutter blades 25 and 26 is in a closed position as in FIGS. 2 or 3, as shown in dotted outline in FIG. 10, the brake and locking part 172 of rocker 169, 170 engages the cut-out 182 of this shutter blade, causing the latter to be form-fittingly locked in its position. If shutter blade 25 is in its open position, as in FIG. 1, the brake and locking part 171 of the other rocker 167, 168 engages the cut-out 181 of shutter blade 25 in order to lock it form-fittingly in its position, as is shown in FIG. 10 by broken lines.

If shutter blade 25 is to be moved from its closed position of FIG. 2 into its open position of FIG. 1, winding 153 is energized. This causes armature 159 to move toward core 155 during which process the two rockers 167, 168 and 169, 170 are moved by means of rod 162 and tappet head 163, overcoming the actions of springs 174 and 177, so that brake and locking parts 171 and 172 are completely lifted out of the area or path of travel of shutter blade 25. Thereupon shutter blade 25 may be moved into its open position by means of a drive impulse as described with reference to FIG. 2. Just prior to shutter blade 25 reaching its open position, the flow of current through winding 153 is interrupted. As a result, the two rockers 167, 168 and 169, 170 are subjected to the actions of their associated springs 174 and 177. Rocker 169, 170 immediately returns to the position shown in FIG. 10 with no effects other than that, by means of arm 169, tappet head 163, and rod 162, armature 159 is pushed outwardly and away from core 155. The other rocker 167, 168 also initially presses with its arm 167 upon tappet head 163, but soon touches its brake and locking part 171 at the circumferential edge of shutter blade 25, as is seen in solid outline in FIG. 10. Thus, a braking effect is exerted upon shutter blade 25. As soon as this shutter blade has reached its open position completely, cut-out 181 comes into range for brake and locking part 171 which, thereupon, snaps into place within cut-out 181 and thus locks the shutter blade form-fittingly in its final position.

If, conversely, shutter blade 25 is to be moved from its open position into its closed position, as shown in FIG. 2, again winding 153 is energized. This causes the two rockers 167, 168 and 169, 170 to be swivelled, by means of armature 159, rod 162, and tappet head 163, overcoming the actions of springs 174 and 177, so that the brake and locking pieces 171 and 172 are completely lifted out of the travel path of shutter blade 25. Now the shutter blade may be moved into its closed position by means of a drive impulse, as described with reference to FIG. 1. Just before the closed position has been fully reached, the flow of current through winding 153 is interrupted. The two arms 167 and 169 of rockers 167, 168 and 169, 170, facing one another, and under the action of springs 174 and 177, using tappet head 163 and rod 164, push armature 159 away from core 155. But, subsequent to a brief travel, brake and locking piece 172 of rocker 169, 170 touches the circumferential edge of shutter blade 25 whereupon spring 174 of the other rocker 167, 168, by itself, pushes armature 159 further out. Brake and locking piece 172, touching shutter blade member 25 at its circumferential edge, effects a braking action upon the shutter blade member. As soon as shutter blade member 25 has fully reached its closed position, cut-out 182 comes within the range of brake and locking piece 172 which, thereupon, snaps into the cut-out 182, thus locking the shutter blade form-fittingly in its closed position.

It has already been noted that it is appropriate to have the second brake device, which corresponds to brake device 52 in FIGS. 1, 2, 3 and 4, designed in the same manner as the described brake device 151. Also, the mode of operation of the second brake device, together with shutter blade 26, is fully analogous, as described above. The principal functional difference between the first described brake device 51 and the design variation 151 of FIGS. 10 and 11 is as follows: in brake device 51 the force available for separating armature 50 from core 55 is practically the same as the pressing force of the brake and locking piece 65 upon the circumferential edge of the shutter link 23 to be stopped, because the named forces are generated by the same leaf spring 63. In order to assure a not too abrupt braking of shutter blade member 23, the pressing force of brake and locking piece 65 must not exceed a certain value. This relatively low value of force, however, prompts a relatively long delay in the separation of armature 59 from core 55 following the discontinuance of the flow of current to winding 53, since it is a known fact that magnetic energy does not stop instantly but decreases gradually in accordance with an e-function. The longer the so-called decrease period lasts, the greater is the displacement of the point in time, of the separation of armature 59 from core 55, into an almost flat portion of the energizing/time characteristic. There results the disadvantage of manufacturing-related tolerances in the brake device prompting noticeable scattering in the decrease period of the armature which, in turn, makes for difficulties in observing an accurate period of time required for stopping.

On the contrary, in brake device 151 of FIGS. 10 and 11, the force available for separating armature 159 from core 55 when the flow of current through winding 153 is discontinued, is about double that of the pressing force of brake and locking piece 171 or 172 upon the circumferential edge of shutter blade 25. This is true because in each case only one spring 174 or 177 generates the pressing force for brake and locking piece 171 or 172, whereas both springs 174 and 177, together, generate the force serving to separate armature 159 from core 155 for as long as brake and locking piece 171 or 172 does not yet touch the circumferential edge of shutter blade 25. For as long as one of the brake and locking pieces 171 and 172 touches the circumferential edge of shutter blade 25, only spring 177 or 174 of the other rocker is effective for the further off-movement of armature 159 from core 155. This is fully adequate since, with increasing distance of the armature from the core, the magnetic retaining force decreases rapidly. One achieves a shorter decrease period because, as noted, following the discontinuance of the flow of current through the winding, the force available for the separation of armature 159 from core 155 may be nearly double that available in the case of brake device 51 or 52, with unchanging pressing force of the brake and locking piece upon the circumferential edge of the shutter blade to be stopped. Thus, the point in time of separation of armature 159 from core 155 is still within a relatively steeply decreasing portion of the energizing/time characteristic. This results in the advantage that manufacturing-related tolerances of the solenoid have but a minor effect upon the decrease period. Hence, there are fewer efforts required to design and adjust brake device 151 in such manner that the desired braking action does not occur with certainty.

Instead of approximately doubling the armature return force as compared with brake device 51, one may choose a less severe increase in armature return force and also reduce the pressing force of the brake and locking piece 171 or 172 which is activated in a given case. Of course, this necessitates a correspondingly longer braking path of shutter blade 25 to be stopped, but, again, it effects an advantage in that greater manufacturing tolerances are permissible without one having to accept interferences upon the braking action because of them.

In summary, it can be said that the design execution of brake device 151 shown in FIGS. 10 and 11 is more advantageous for mass production because differences resulting from manufacture have much lesser effects upon the desired braking action than is true for the brake device 51 or 52 described with reference to FIG. 1. A further advantage is due to the fact that after braking of one of the shutter blade members, the brake and locking piece 171 or 172, respectively, snaps into the cut-out 181 or 182, respectively, more rapidly and consequently improves its function in immediately locking the shutter blade member as it reaches its rest position, because the associated spring 174 or 177, respectively, has to overcome the inertia and friction of one rocker 167, 168 or 169, 170, respectively, only but not the higher inertia of the armature 159 and elements 162 and 163 fixed thereto.

Obviously, many other modifications and variations of the present invention are made possible in the light of the above teachings. It is therefore to be understood that within the scope of the appended claims the invention may be practiced otherwise than as specifically described.

So the shutter blade members 23 and 24 may be mounted for rotation by means of needle bearings, slide bearings or conical bearings. Other embodiments of the invention may have shutter blade members movably mounted for to-and-fro movements along straight or curved guides. The drive devices 31 to 34 as well as the brake devices 51, 52 or 151 may have solenoids with knife-edge armatures or moving coils. Instead of the photo-electric position monitors 71, 72 and 73, capacitive or inductive position monitors or even end-contacts may be used.

In certain cases, a (not shown) modification of the shutter device may be of advantage, wherein the drive devices 31 to 34 are each provided with a spring, instead of a solenoid, for actuating a percussion armature similar to the armatures 35 to 38. The mentioned springs must of course be cocked by hand, or by the action of a motor, and the cocked springs are individually releasable each upon energization of a small solenoid actuating a release means, at the moment as the associated shutter blade member shall be actuated.

What is claimed is:

1. A shutter device for a photographic camera, including two shutter blade members each mounted for movement between a first and a second rest position for opening and closing a camera aperture, first drive devices mounted on said camera and being operatively associated with each of said shutter blade members for moving said blade members during an exposure sequentially and at a time interval, in the same direction, from the first rest position to the second rest position, and second drive devices mounted on said camera and being operatively associated with each of said shutter blade members for returning moving said blade members during a subsequent exposure sequentially and at a time interval, in an opposite direction, from the second to the first rest position, each of said shutter blade members being mounted in place for free rotation movement, and each of said drive devices including a percussion armature having a striker means mounted at one end thereof, said drive devices functioning with an associated shutter blade member via said striker means in such a manner that said shutter blade members are movable from the first to the second rest position, and vice versa, by means of the percussion armature of said drive devices, through sudden acceleration and subsequent free travel.

2. The shutter device according to claim 1, wherein each of said drive devices includes a solenoid associated with the percussion armature thereof for movement of said armature when energized, said striker means contacting its associated shutter blade member upon energization of its solenoid so as to effect acceleration of the associated shutter blade member upon energization of its solenoid so as to effect acceleration of the associated shutter blade member from rest to a maximum speed.

3. The shutter device according to claim 1, wherein the camera includes a fixed axle mounted thereon, and each of said shutter blade members is, at least near its center of gravity, mounted for rotation on said fixed axle.

4. The shutter device according to claim 3, wherein said shutter blade member comprises a shutter blade forming a circular sector and having an arm projecting from its vertex, said circular sector and said arm being arranged on opposite sides of said axle, said percussion armature of one of said first and second drive devices cooperating with an edge portion of one of said shutter blades through its striker means, and said percussion armature of another of said first and second drive devices cooperating with an edge portion of said arm of the shutter blades through its striker means.

5. The shutter device according to claim 1, wherein said percussion armature of each said driver device has an operative path of movement limited to such an extent that upon activation of said driver device the associated shutter blade member begins its free travel before the shutter blade member starts to sweep across said aperture.

6. The shutter device according to claim 1, wherein brake devices are provided for each said shutter blade member, said brake devices being so located as to lock the shutter blade members both in said first and second rest positions and to smoothly stop the movement of said shutter blade members when entering said first and second rest positions after having completely uncovered or covered said aperture.

7. The shutter device according to claim 6, wherein each said device includes at least one brake arm and a spring biasing said brake arm, each said brake device further including a solenoid for moving said brake arm, against the action of said spring, out of the path of movement of said shutter blade member when the solenoid is energized, said spring biasing said brake arm so as to contact said shutter blade member for braking and stopping same when said solenoid is de-energized.

8. The shutter device according to claim 7, wherein said shutter blade member is mounted for rotation about a fixed axis, said shutter blade member having a circular edge concentric with said axis, and said brake arm being so disposed as to contact radially said circular edge of said shutter blade member upon de-energization of said brake device solenoid.

9. The shutter device according to claim 2, wherein each said percussion armature is arranged to be reset in its initial position, after energization and subsequent de-energization of the associated drive device solenoid, by impact of the associated shutter blade member against the striker means of said armature as said shutter blade member is returning to its first or second rest position.

10. The shutter device according to claim 9, wherein means are provided for partly energizing said drive device solenoid during the impact of the associated shutter blade member against said striker means of the percussion armature.

11. The shutter device according to claim 6, wherein each said brake device includes a pair of two-armed rocker elements each pivotally mounted on said camera, spring means biasing each of said rocker elements for movement so as to contact said shutter blade member for braking and stopping same, and each said brake device including a solenoid having an armature and a tappet engaging one arm of said rocker elements for movement thereof out of the path of movement of said shutter blade member, against the action of said spring means, as said brake device solenoid is energized.

12. The shutter device according to claim 11, wherein the camera includes a fixed axle mounted thereon, and each shutter blade member is mounted for rotation on said fixed axle, said shutter blade member having a circular edge concentric with said axle, said rocker elements being so disposed as to contact radially said circular edge of said shutter blade member upon de-energization of said brake device solenoid.

13. A shutter device for a photographic camera including a first and a second shutter blade members each mounted for independent movement between a first and a second rest position for opening and closing a camera aperture, the first shutter blade member in its first rest position entirely covering said aperture and in its second rest position being located away from said aperture at one side thereof, the second shutter blade members in its first rest position being located away from said aperture at an opposite side thereof and in its second rest position entirely covering said aperture, and further including first drive devices mounted on said camera and being operatively associated with each of said shutter blade members for moving said shutter blade members sequentially and at a time interval suitable for an exposure, in the same direction, from the first rest positions to the second rest positions, and second drive devices mounted on said camera and being operatively associated with each of said shutter blade members for moving said shutter blade members sequentially and at a time interval suitable for an exposure, in an opposite direction, from the second to the first rest positions.

* * * * *